United States Patent
Zhang

(10) Patent No.: US 6,713,710 B1
(45) Date of Patent: Mar. 30, 2004

(54) APPARATUS AND METHOD FOR TRACKLESS MOVEMENT AND FULL PENETRATION ARC WELDING

(75) Inventor: Shaobin Zhang, 245 Codell Dr., Apt. 358, Lexington, KY (US) 40509

(73) Assignee: Shaobin Zhang, Lexington, KY (US)

( * ) Notice: Subject to any disclaimer, the term of this patent is extended or adjusted under 35 U.S.C. 154(b) by 0 days.

(21) Appl. No.: 10/270,221

(22) Filed: Oct. 15, 2002

(51) Int. Cl.[7] .............................................. B23K 10/00
(52) U.S. Cl. ........................ 219/121.45; 219/121.58; 219/121.48; 219/121.34; 219/124.22
(58) Field of Search ................... 219/121.45, 121.46, 219/121.48, 121.58, 121.36, 74, 75, 124.22, 137 R, 124.34, 124.45, 124.31; 228/168, 169

(56) References Cited

U.S. PATENT DOCUMENTS

| | | | |
|---|---|---|---|
| 3,701,881 A | * 10/1972 | Rother et al. ................ | 219/123 |
| 3,922,517 A | * 11/1975 | Nelwson et al. ......... | 219/137 R |
| 4,255,641 A | * 3/1981 | Connell et al. ................ | 219/61 |
| 4,636,612 A | * 1/1987 | Cullen .................... | 219/124.34 |
| 5,099,098 A | * 3/1992 | Burgoon ...................... | 219/60 |

* cited by examiner

Primary Examiner—Mark H. Paschall

(57) ABSTRACT

An apparatus, system and related method are disclosed for performing trackless movement and full penetration welding along a weld line, irrespective length and configuration of a butt joint. A pre-existing gap of the weld line is used to act a guide slot and a guide wheel unit to track the gap is designed to perform trackless movement using an electric or manual winch as a driver. In the automatic arc welding systems, the guide slot and the guide wheel unit can save an external track and a seam-tracking device. A movable weld backing is held against the underside of the weld line to support liquid metal and control backside bead to achieve full-penetration welding of a butt weld. The movable weld backing and a welder are arranged the underside and the topside of base metals to be welded, respectively, using a connector member through the pre-existing gap of the weld line. According to the apparatus, flux-cored wire plasma arc can perform full penetration welding. A layer of liquid slag between the moveable backing and the liquid metal of the underside weld pool can act as a lubricant to increase the sliding ability of the moveable backing, act as a heat insulator to protect the backing from the high temperature of plasma arc, and provide a shielding film for the weld pool.

10 Claims, 4 Drawing Sheets

APPARATUS AND METHOD FOR TRACKLESS MOVEMENT AND FULL PENETRATION ARC WELDING

TECHNICAL FIELD

This invention relates to the field of metal joining, and more particularly, to a trackless movement apparatus and full-penetration method for welding of a butt joint of large steel structures.

BACKGROUND OF THE INVENTION

Arc welding technologies are widely used in modern manufacturing and industrial processes. However, in practical applications, conventional methods of arc welding have presented following drawbacks. First, in most case, multi-pass welding and beveling of the plate edge is used to complete a butt joint of thick steel plates of large structures, which increases welding time and cost. Second, mechanized equipment for welding of large steel structures is more complicated and expensive. Third, conventional automatic arc welding equipment normally employs a track for making a long weld, hence seam tracking plays a critical role in generating sound welds in many automatic welding applications. The seam tracking technique, however, cannot be widely used in welding production currently due to its low reliability and high cost.

To perform full penetration welding, it is normal practice to make butt welds from both sides of the plates. However, in large steel construction the ideal is to complete butt welds from one side, for example, it is difficult to turn a ship over for welding the second side. This procedure has led to the development of welding technologies of full penetration weld from one side. As widely known, full penetration weld from one side for a butt joint could be typically achieved in two ways.

First, methods have been proposed to sense joint penetration, such as infrared sensing, ultrasound, and pool oscillation primarily for gas tungsten arc welding process or measuring keyhole to control weld penetration for plasma arc welding process. However, these sensing technologies for welding penetration have not being used in welding production because of their sensitivity for welding conditions. For example, when weld joint gap is not constant in an entire weld line sense and control of weld penetration will be very difficult for an automated arc welding process.

In the second method for full penetration welding, a weld backing made from copper, with its length identical to the length of the weld line to be welded and its configuration fitting to the shape of the weld line, is used to hold against the underside of the weld zone where a groove is formed. In this condition, an arc welding torch or welder is moved along the weld line to weld throughout the entire length of the weld line. After completion of welding, the weld backing and its supporting members are removed.

In another application of weld backings, a number of ceramic weld backings in adequate shapes with adhesive aluminum foil adhere to the underside of the groove face of the weld zone along the entire weld line. Then, an arc welder is moved to weld throughout the entire length of the weld line, and after completion of welding, the ceramic weld backings are removed.

There are, however, a number of flaws with these conventional weld backings. For the weld backing made from copper, the length of the weld backing should be the same as the length of the weld line and the weld backing having the same curvature as that of the weld line is required in the case of a curve of weld line. Therefore, general-purpose ability of such a weld backing is poor for straight or curve weld lines and the cost of the material, processing and application increases when the weld line becomes longer. In addition, the installation and removal of such weld backings in practical welding production is difficult.

Another attempts have been proposed to overcome these drawbacks. For example, U. S. Pat. No. 5,590,829 describes a mobile weld backing mounted on a wheeled carriage to place at the underside of the workpiece during welding and to provide a moveable weld backing system along a weld line to perform full penetration welding of a box-shaped workpiece. By mounting a backing on a wheeled carriage, the foregoing flaws can be improved to some extent. However, the prior art has still some drawbacks in practical applications. In the invention, because the welder in top side of a weld line and the wheeled carriage mounting a weld backing in the underside separately travel along an entire weld line the control of the movement of the welder and the wheeled carriage with a backing synchronously is complicated. Another disadvantage of the invention is poor in general-purpose application because the method can be only used in welding of box-shaped workpiece.

Consequently, the obvious expense and complicated equipment and operation of the conventional arc welding processes have been forcing fabricators to explore new technologies for possible cost savings, increase of productivity, and simplification of machine and operation in welding of large steel structures.

Therefore, in order to overcome the above-described flaws accompanying conventional arc welding technologies, it is the main object of the invention to provide a trackless movement and full-penetration apparatus and high-efficiency arc welding methods based on this apparatus.

SUMMARY OF THE INVENTION

Accordingly, a general object of this present invention is to provide a trackless movement and full-penetration arc welding apparatus and welding methods based on this apparatus to improve productivity of conventional arc welding technologies and simplify equipment for fabricating large steel structures. In this invention, all of the above-described difficulties accompanying conventional arc welding processes can be overcome.

The basic idea of this present invention is that an apparatus with the trackless movement and full penetration functions will be assembled with a butt joint based on a preexisting gap (3 mm–10 mm) of a weld line. In the apparatus, a movable weld backing is held against the underside of the weld line to support liquid metal and control backside bead to achieve full-penetration welding of a butt weld. The movable weld backing and a fixing plate of the welding torch are arranged the underside and the top sided of the workpiece, respectively, using a connecting member through the pre-existing gap of the weld line. Thus, the moveable weld backing moves synchronously with the movement of the welding torch along an entire weld line to continuously perform full penetration welding. Three compression springs are installed a guide wheel unit and two roller units, respectively, to hold the movable backing against the underside of the workpiece in flat position for welding. The movable backing made from copper is of water cooling type. In the weld backing, shielding gas, such as $CO_2$, as backing purge gas is used to protect the backside weld region from atmosphere contamination (oxygen and nitrogen) for welding of alloy steel materials.

In order to perform trackless movement, the pre-existing gap of the weld line is used to act a "guide slot" and a guide wheel unit to track the gap is designed in this apparatus. In practical applications, the guide wheel unit is placed ahead of the welding torch and a guide metal wheel with the inclined planes contacts with the pre-existing gap to guide the welding torch and the apparatus to move along the weld line to automatically perform seam tracking. For automatic arc welding systems, the invention of through-the-pre-existing-gap "guide slot" and the guide wheel unit can save an external track and a seam-tracking device, and increase the accuracy and reliability to track a weld line. The apparatus substantially simplify conventional automated arc welding equipment and methods, and welding operation, thereby, in the practical applications an electrical or a manual winch can be used as a driver to drag the apparatus with a welding torch to travel along a weld line to perform full penetration welding, irrespective of the length and configuration of a butt joint. In the automatic or semi-automatic (for a handle winch) arc welding system, the winch may be temporarily placed to an end of the base metals to be butt-welded and its chain is connected to the apparatus to drag it to move along the weld line with the winch rotation. During welding the winch is stationary and does not move with the welding apparatus. This means the welding system cannot be limited by an external track to weld a long butt joint after setting up the welding apparatus.

Another applicable trackless mechanized carriage with the moveable weld backing is designed. In the trackless mechanized carriage, an electric or manual winch or a servomotor can be use to drive the mechanized carriage apparatus with the moveable weld backing and the torch to perform full penetration welding.

Therefore, the movable weld backing for full penetration welding and the guide wheel unit and through-the-pre-existing gap "guide slot" for seam tracking is integrated in the apparatus of this present invention.

According to this apparatus, a single-pass and one-side full penetration welding method can be performed by use of a plasma arc to melt weld zone and weld metal to fill the pre-exiting gap and form the weld reinforcement using the movable backing. Plasma arc is chosen preferably in the welding process because of its higher concentrated heat and higher temperature in contrast of non-constricted arc. Thus, plasma arc can deeply penetrate metal materials and weld the thick plates in some practical applications. Additionally, in this process, the flux-cored wire as a filler metal can be added to the leading edge of the weld puddle using a mechanized wire feeder. Based on the physical and chemical characteristics of the flux-cored wire, it as a filler metal for trackless movement and full penetration plasma arc welding process can bring the following important effects:

(a) A layer of liquid slag between the moveable backing and the liquid metal of the backside weld pool will act as a "lubricant" to increase the sliding ability of the moveable backing. Their interfacial surface tensions, the slag-liquid metal and the slag-solid backing, can be altered by using of changing or adjusting the components in the flux-cored wire so that the liquid slag of the flux-cored wire can act as a "lubricant" effect in this process.

(b) The layer of the liquid slag acts as a very efficient heat "insulator", and thus reduces the rapid dissipation of the heat of arc to protect the backing from the high temperature of plasma arc.

(c) The liquid slag film can provide a shielding layer for the weld pool from atmosphere contamination (oxygen and nitrogen).

(d) Substantially improve the composition and microstructure of the weld and mechanical properties of the weld joint due to increase of alloy element transfer efficiency and deoxidations.

Therefore, the new arc welding process, flux-cored wire plasma arc welding based on the apparatus of this present invention, can implement full penetration welding in single-pass without a preparation of the bevels for a large steel structure.

Based on the apparatus of the present invention, three arc welding methods, flux-cored wire plasma arc, submerged arc, and flux cored arc welding processes can be able to perform full penetration welding of a butt joint for large structures from one side.

According to the present invention, the apparatus and methods are applicable not only to weld a butt joint but also to weld a corner joint by use of a fitting moveable weld backing and practical arrangement of the mobile apparatus of the present invention.

BRIEF DESCRIPTION OF DRAWINGS

The accompanying drawings, which are incorporated in and form a part of the specification, illustrate the embodiments of the present invention and, together with the description, serve to explain the principle of the invention. In the drawings.

DESCRIPTION OF THE PREFERRED EMBODIMENT

Figure 1:
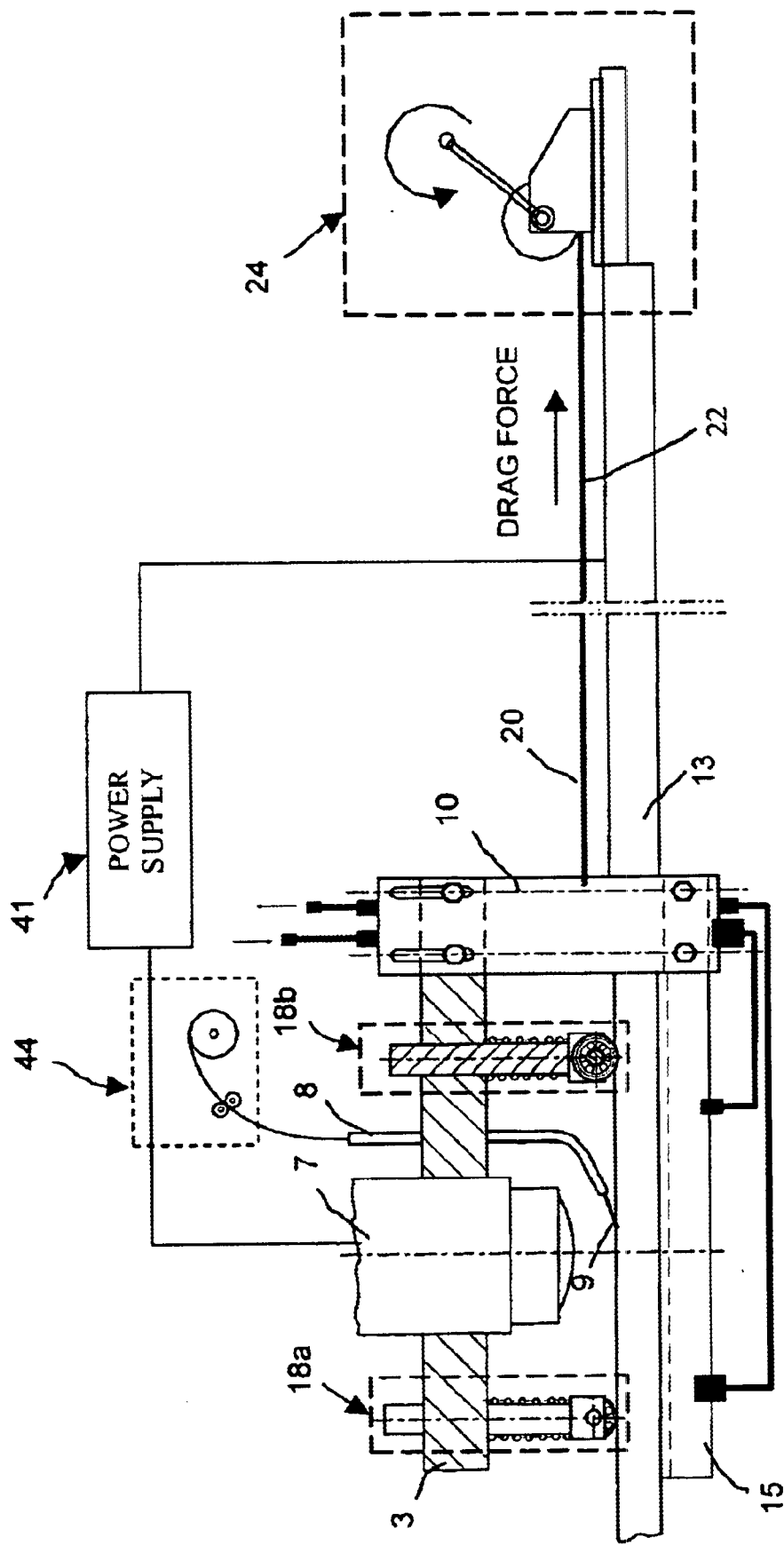
FIG. 1 shows a preferred trackless movement and full-penetration flux-cored plasma arc welding system, including the apparatus of the present invention, an electric or manual winch for driving the apparatus, a welding power supply, a plasma arc welding torch, and a flux-cored wire feeder system.

With reference to the drawings of preferred embodiments of a trackless movement and full penetration welding system and apparatus according to the invention will be hereinafter described. Referring now to FIG. 1, which is a drawing showing one possible embodiment of a trackless movement and full penetration welding system. This illustrated system includes a moveable weld backing 15, a fixing member 3 of a welding torch, a connection member 10, a guide wheel unit 18b, two roller units 18a, an electric or manual winch 24, a welding torch 7, a wire feeder unit 44, flux cored wire 9, filler wire nozzle 8, electric source 41. According to the invention, the electric source 41 can be used to generate a plasma arc between the base metals 13 and the welding torch 7. The plasma arc generated by the welding torch 7 is moved along a weld line, while melting the edges of the base metals 13 and the flux cored wire 9 of weld metal. In this process, the flux-cored wire 9 as a filler metal can be added to the leading edge of the weld puddle using a mechanized wire feeder 44. In this invention, the flux-cored wire 9 are chosen preferably as a weld metal because a layer of liquid slag between the moveable backing 15 and the liquid metal of the backside weld pool can act as a "lubricant" to increase the sliding ability of the moveable backing and act as a very efficient heat "insulator", to protect the backing from the high temperature of plasma arc, and provide a shielding film for the weld pool. In the automatic or semi-automatic (for a manual winch) arc welding system, the winch 24 can be placed to one end of a butt weld and a chain 22 can be connected to the apparatus to drag the said apparatus to move along the weld line, irrespective of the length and configuration of a butt joint. Therefore, during welding the winch 24 is stationary and does not move with the welding apparatus. This means the welding system is not limited by an external track to weld a long butt joint after setting up the welding apparatus. In order to perform trackless movement, the pre-existing gap 26 is used to act a "guide slot" and a guide wheel unit 18b to track said gap 26 is designed in this apparatus. In practical applications, the guide wheel unit 18b is placed ahead of the welding torch 7 and is used to track the pre-existing gap 26 to guide the welding torch and the apparatus to move along the weld line to automatically perform seam tracking.

Figure 2:
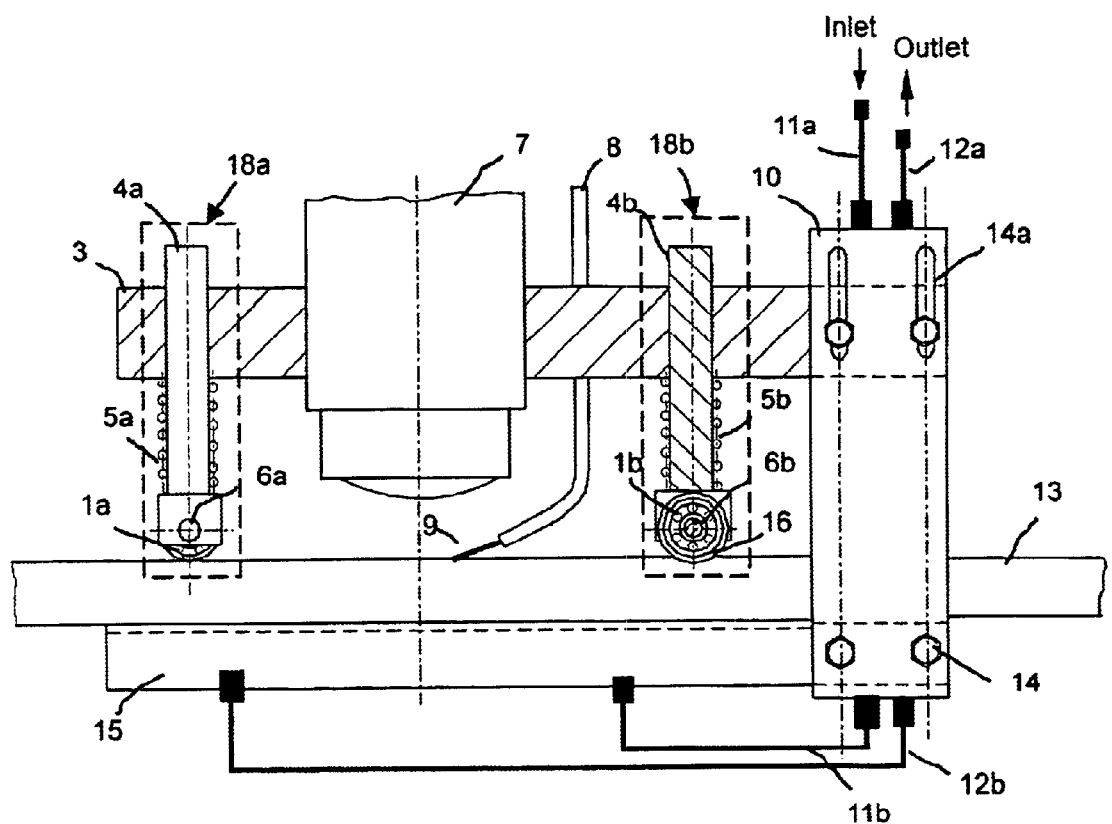
FIG. 2 shows a front view of a preferred embodiment of the present invention.
Figure 3:
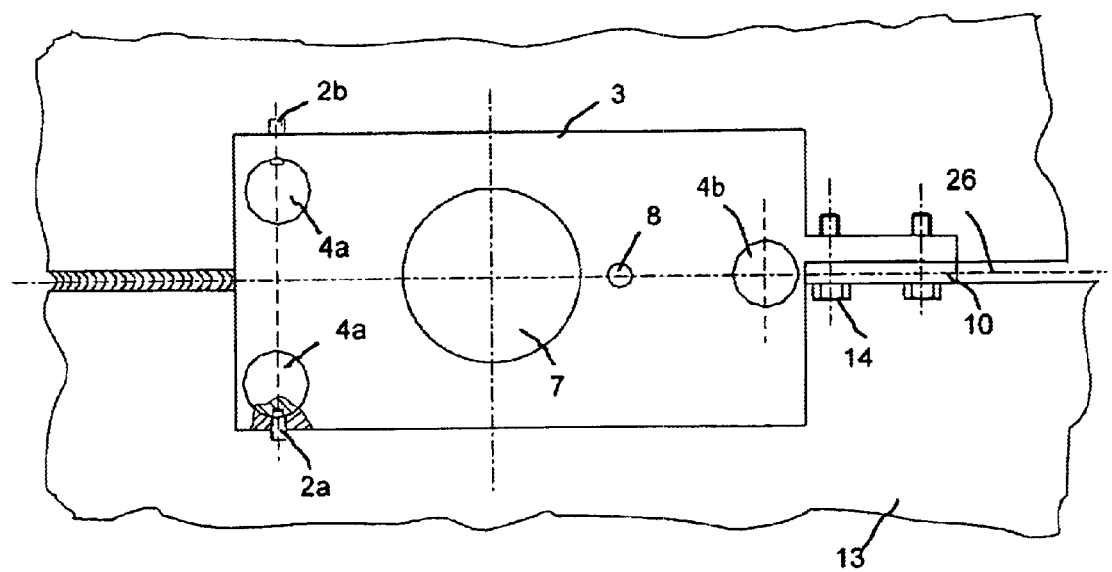
FIG. 3 shows a top view of a preferred embodiment of the present invention.

The basic structure and operation of this trackless movement and full penetration welding apparatus are shown in FIGS. 2 and 3. Two base metals or two steel metal plates 13 to be butt-welded by a flat position welding are arranged a preexisting gap 26 according to the invention. A connection member 10 is perpendicularly-positioned though the pre-exiting gap 26. The connection member 10 with two slots 14a on the upper portion and two through holes 14b on the lower portion is used to connect a fixing member 3 of welding torch above the top side of the based metals 13 and the movable weld backing 15 beneath the underside of the base metals 13 using bolts 14. The fixing member 3 of welding torch is positioned horizontally and paralleled with the front plane of base metals 13. On the fixing member 3 of welding torch, there are five through-holes where the welding torch 7, a guide shaft 4b of the guide wheel unit 18b, two guide shafts 4a of the roller unit 18a, and the filler wire nozzle 8 are fixed through these holes, respectively. To keep the movable weld backing 15 in close contact with the underside of the base metals 13 to be butt-welded during welding, three compression springs 5b, 5a are installed a guide shaft 4b of the guide wheel unit 18b and guide shafts 4a of two roller units 18a, respectively. When assembling the welding apparatus with base metals to be butt-welded according to the invention, an energized pressure of three compression springs 5a, 5b is pre-produced and acts on the fixing member 3 of the welding torch. Because the fixing member 3 of the welding torch and the moveable weld backing 15 is connected by use of the connector member 10, the pressure also acts on the moveable weld backing 15 and keeps it in close contact with the underside of the base metal 13 during welding. The movable weld backing 15 moves synchronously with the welding torch 7 along an entire weld line and holds against the underside of the base metal 13 to support weld pool and control backside bead to continuously perform full penetration welding of a butt joint in flat position. Said roller units 18a consist of a guide shaft 4a, a ball bearing 1a, a support shaft 6a, and compression spring 5a. Two locator screws 2a, 2b are installed and inserted into a slot of the guide shaft 4a to prevent said roller units 18a rotation during welding.

Figure 4:
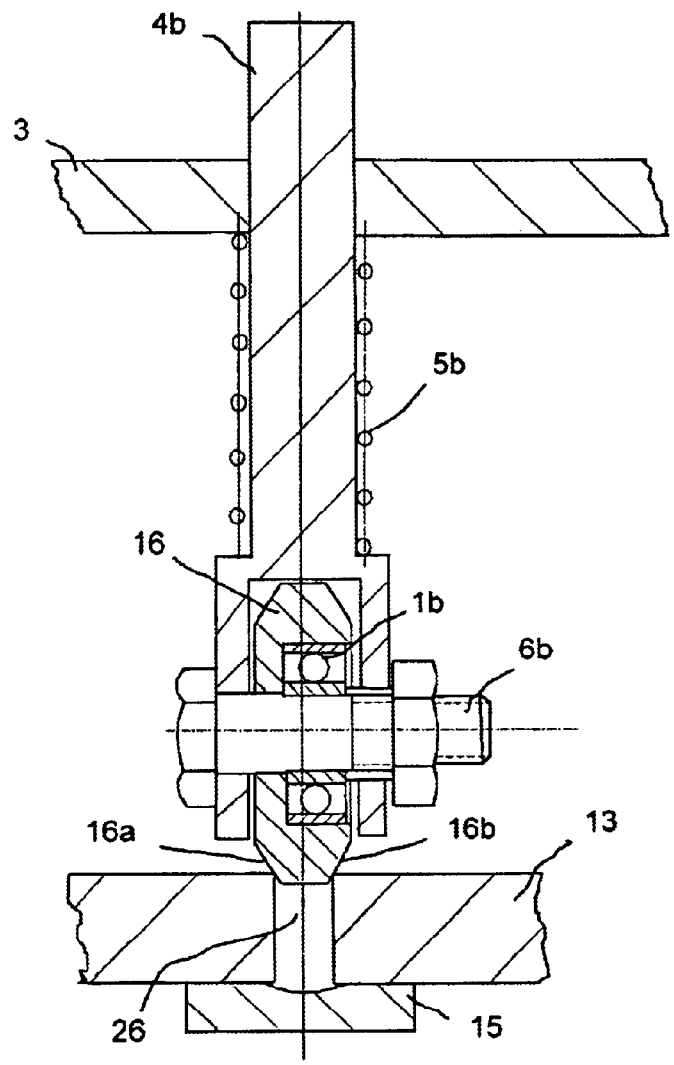
FIG. 4 shows a guide wheel unit in preferred apparatus of the present invention.

Referring now to FIG. 4, the guide wheel unit 18b is comprised: a guide metal wheel 16 with inclined planes 16a, 16b, a ball bearing 1b installed into the guide metal wheel 16, a guide shaft 4b, a support shaft 6b, and compression spring 5b. During welding, the inclined planes 16a, 16b of the guide metal wheel 16 keep in contact with the pre-exiting gap 26 under the pressure of the compression spring 5b to continuously track the weld line and to guide the apparatus to move along a weld line to perform trackless movement.

Figure 5:
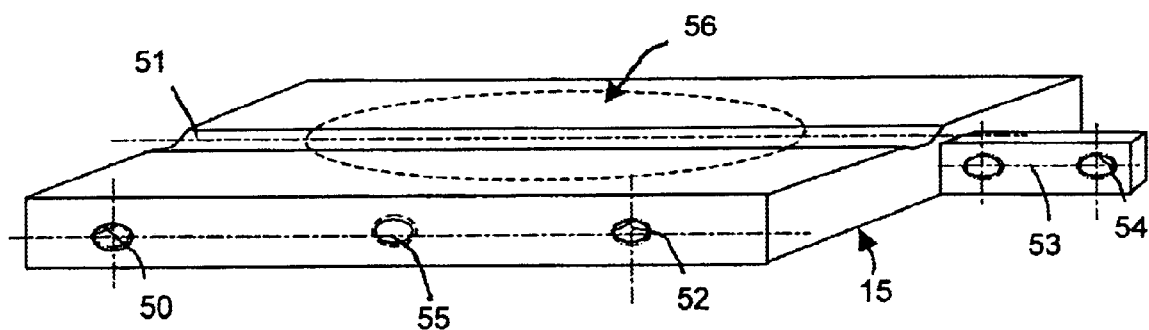
FIG. 5 is a schematic drawing of the water-cooling weld backing with shielding gas.

Referring to FIGS. 1, 5, the moveable weld backing 15 made from copper is cooled by water introduced through cooling water pipe 11a, 11b, and a water adapter 52. The cooling water returns through a water adapter 50, and cooling water pipe 12b, 12a. A groove 51 where it forms a weld is used in the movable backing. In the weld backing, shielding gas, such as $CO_2$, as backing purge gas is used to protect the backside weld region from atmosphere contamination (oxygen and nitrogen) for welding of alloy steel materials. The shielding gas can be introduced through a shielding gas adapter 55 into the moveable backing 15 and flows out from small outlet holes in the region 56 of the moveable backing. In this present invention, $CO_2$ shielding gas provides not only shielding gas for weld zone from atmosphere contamination but also cooling effect for the moveable backing 15. In order to align the centerline between the moveable backing 15 and the weld line after assembling, a connection plane 53 with two screw holes 54 in the moveable backing 15 are designed to connect the connector member 10 using two bolts 14 as shown in FIGS. 2, 5.

Figure 6:
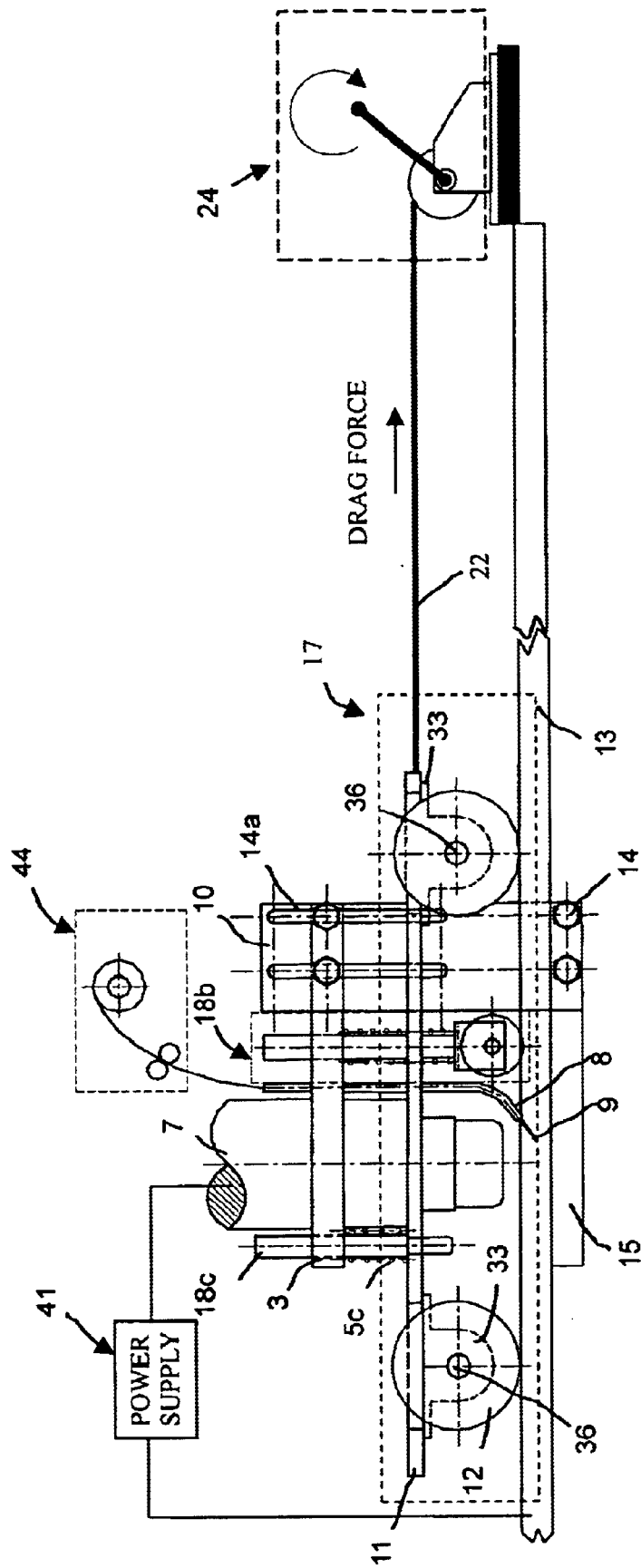
FIG. 6 shows a mechanized carriage trackless movement and full-penetration flux-cored plasma arc welding system, including the mechanized carriage with trackless movement and full-penetration functions, an electric or manual winch for driving the apparatus, a welding power supply, a plasma arc welding torch and a flux-cored wire feeder system.

FIG. 6 shows second embodiment of the trackless movement and full penetration welding system of this present invention. In second embodiment of this invention, a mechanized carriage 17 can be used to perform trackless movement and full penetration welding along the weld line to be welded. The basic operation of the mechanized carriage trackless movement and full penetration welding system is similar with first embodiment introduced above. Referring to FIG. 6 only inherent features of the second embodiment will be described in following description.

The mechanized carriage 17 consists of four wheels 12, four bearings 33, two shifts 36, and a carriage frame 11. The fixing member 3 of welding torch is installed in the carriage frame 11 using two shafts 18c, and two compressing springs 5c. The connector member 10 perpendicularly can be inserted through the pre-exiting gap 26 and connects with the movable backing 15 placed the underside of a butt joint and the fixing member 3 of the welding torch arranged above the weld joint, respectively. The guided wheel unit 18b can be placed ahead of welding torch 7 and track the preexisting gap 26 constantly. Three compression springs 5c, 5b are installed two guide posts 18c, and the guide shaft 4b of the guide wheel unit 18b to produce a energizing force to act on the fixing member 3 of welding torch and to hold the movable backing 15 in contact with the underside of workpiece during welding. In the mechanized carriage system an electric or manual winch as a driver can be used to drag the whole apparatus including a welding torch 7 along a weld line to perform trackless movement and full penetration welding.

According to the present invention, three arc welding methods, flux-cored wire plasma arc, submerged arc, and flux cored arc can perform trackless movement and full penetration welding of a butt joint by use of this present invention apparatus.

According to the present invention, the trackless mechanized apparatus and correspond with arc welding processes is applicable not only to weld butt joint but also to weld corner joint by use of a fitting moveable backing and practical arrangement of the mobile apparatus of the present invention.

What is claimed is:

1. An apparatus with trackless movement and full penetration welding from one side, comprising:
   a. a preexisting gap of weld line to be welded, which can act a guide slot to perform trackless movement;
   b. a guide wheel unit which can be used to track said guide slot of said pre-existing gap;
   c. a movable weld backing which is held against the underside of the workpiece to support weld pool and control backside bead;
   d. a connection member which is upright positioned through said pre-existing gap of weld line to be welded;
   e. a fixed welding torch member which is positioned horizontally;
   f. two roller units which consist of guide shafts, ball bearings, support shafts, and compression springs and perform support for said fixed welding torch member and said movable weld backing to move the welding apparatus along a weld line;
   g. a non-consumable electrode torch with a constricting nozzle to generate plasma arc to melt the weld line;
   h. a wire feeder machine to feed flux-cored wire into a space in where said non-consumable electrode torch generates plasma arc on the weld zone of the base plates to be welded;
   i. a power supply in which polarities are connected between said non-consumable electrode in the torch and the base metal to be welded for generating a plasma arc.

2. The apparatus as in claimed 1, wherein the driving system can be used an electric or a manual winch to drag the welding apparatus to continuously perform full penetration welding along a weld line, irrespective of the length, configuration of a butt joint.

3. The apparatus as in claimed 1, wherein said guide wheel unit consists of a guide metal wheel with two inclined planes, a ball bearing, a guide shaft, a support shaft, and a compression spring.

4. The apparatus as in claimed 1, wherein said cooling medium serving as cooling means is circulated or deposited within said movable backing.

5. The apparatus as in claimed 1, wherein said shielding gas is introduced from an inlet positioned one side into said movable backing and flows out from small holes on the surface in contacted with the underside of a weld zone.

6. Based on the apparatus as in claimed 1, said flux-cored wire plasma arc welding process can be used to perform full penetration welding of a butt weld.

7. The process as in claimed 6, wherein the flux-cored wire as a filler metal can be added to the leading edge of the weld puddle using a mechanized wire feeder.

8. The process as in claimed 6, wherein a layer of liquid slag between the movable backing and the liquid metal of the backside weld pool will act as a "lubricant" to increase the sliding ability of the movable backing.

9. The process as in claimed 6, wherein a layer of liquid slag as an efficient "heat insulator" so as to protect the movable backing from the high temperature of the plasma arc.

10. Based on the apparatus as in claimed 1, flux-cored arc and submerged arc welding processes can be used to perform full penetration,welding of a butt weld.

* * * * *